United States Patent [19]

Dorland

[11] Patent Number: 4,800,585
[45] Date of Patent: Jan. 24, 1989

[54] SATURATING BIPOLAR SWITCH CIRCUIT FOR TELEPHONE DIAL PULSING

[75] Inventor: Hendricus A. H. Dorland, Hilversum, Netherlands

[73] Assignee: U.S. Philips Corp., New York, N.Y.

[21] Appl. No.: 69,686

[22] Filed: Jul. 6, 1987

[30] Foreign Application Priority Data

Jul. 8, 1986 [NL] Netherlands ............ 8601773

[51] Int. Cl.$^4$ ............................................. H04M 1/30
[52] U.S. Cl. ...................................... 379/364; 379/362
[58] Field of Search ............... 379/362, 364, 368, 355, 379/354, 359, 387

[56] References Cited

U.S. PATENT DOCUMENTS 4,388,499 6/1983 Janssen .......................... 379/362
4,413,159 11/1983 Huizinga et al. ............... 379/364 X Primary Examiner—James L. Dwyer
Attorney, Agent, or Firm—Thomas A. Briody; Leroy Eason

[57] ABSTRACT

A digital telephone set dial pulsing circuit in which the line current switching element is a bipolar transistor. To keep such switching transistor constantly in the saturated state irrespective of the magnitude of the line current, its base is driven by a current source supplying a current linearly related to the line current. In order to prevent an excessive voltage drop in the current source, which would reduce the voltage for the remaining circuits of the telephone set, the current source is voltage-controlled by a control circuit which provides a control voltage linearly related to the line current.

5 Claims, 1 Drawing Sheet

SATURATING BIPOLAR SWITCH CIRCUIT FOR TELEPHONE DIAL PULSING

BACKGROUND OF THE INVENTION

1. Field of the Invention

The invention relates to a telephone set dial pulsing circuit having terminals for connection to the two terminals of a subscriber line, which dial pulsing circuit comprises for pulsed interruptions of the subscriber line a bipolar switching transistor whose main current path is situated between one of the line terminals and the remaining circuit elements of the telephone set and whose emitter is connected to the aforesaid terminal; in which the dial pulsing circuit also comprising a control circuit and a controllable current source connected to the base of the switching transistor, the current source output current increasing with the line current under control of the control circuit.

2. Description of the Related Art

Such a telephone set dial pulsing circuit is known from the U.S. Pat. No. 4,413,159.

It is generally desired in electronic telephone sets suitable for dial pulsing to include an electronic pulsing element, preferably a transistor. To provide that such a telephone set, if connected to a long subscriber line, will receive sufficient supply voltage, the pulsing element is required to have in the conducting state the least possible voltage drop across it.

This requirement of low voltage drop is met by bipolar transistors in the saturated state and by field effect transistors whose gate voltage by far exceeds the threshold voltage. In addition, such conductivity types should be chosen for these two types of transistors that the voltage of their control electrodes is constantly within the voltage existing across the two wires of the subscriber line. The latter requirement is because otherwise a step-up circuit is needed for driving the switching transistor, which is undesired in view of the required additional circuitry and the disturbing high frequency voltages at which such a circuit is to operate.

For the use as a switching transistor in an electronic telephone set which still has to operate even at relatively low line voltages, field effect transistors are less satisfactory than bipolar transistors. The control voltage of a field effect transistor differs considerably (for example 3.5 V) from the voltage of the source electrode, so that at a low DC line voltage (for example 4.2 V) the field effect transistor can be rendered non-conductive by an audio signal having an amplitude of for example 3 V and being superimposed on the DC line voltage.

Bipolar transistors meet the requirements of a low voltage drop and a low drive voltage. These transistors further meet the requirements that their control voltage lies between the voltages of the wires of the subscriber line, if conductivity types are chosen whose emitters can be connected (as regards the direction of conduction) to the telephone set terminals, that is to say to the incoming subscriber line.

In the aforementioned United States Patent a telephone circuit is shown in which the emitter of a bipolar switching transistor is connected to the incoming subscriber line. To keep this switching transistor at any magnitude of the line current in the saturated state without this transistor at a low line current-value deriving too much base current from the line current, this transistor is driven by means of an adjustable current source, linearly relating the base current of the switching transistor to the telephone line current. For this to be achieved the dial pulsing circuit comprises a current mirror circuit, connected in series between the switching transistor and the remaining elements of the telephone circuit. This current mirror circuit there causes a voltage loss of at least one diode forward voltage, so approximately 0.7 V. This takes place at the cost of the available supply voltage of the remaining elements of the telephone circuit, which is undesired.

SUMMARY OF THE INVENTION

The invention has for its object to provide a telephone set dial pulsing circuit in which the line voltage only diminished by the saturation voltage of a transistor is available to the remaining elements of the telephone circuit.

A telephone set dial pulsing circuit in accordance with the invention is characterized in that the control circuit comprises converter means for obtaining a control voltage proportional to the line and in that the controllable current source is designed as a voltage-controlled current source, the control voltage coming from the converter means being supplied to the current source control input.

The invention is based on the inventive understanding that providing a control voltage proportional to the line current, combined with a voltage-controlled current source, causes considerably less voltage drop than providing directly a control current proportional to the line current.

The telephone set dial pulsing circuit embodying the invention is characterized in that the current source comprises a control transistor and a main current transistor, its collector forming the output of the current source, its emitter being connected on the one side via an emitter resistor to the other terminal and on the other side to the base of the control transistor, and its base being connected to the collector of the control transistor, in that the emitter of the control transistor forms the control input of the current source and in that supply means are available for supplying the current from the former terminal to the collector of the control transistor.

The thus obtained current source supplies a current to the base of the switching transistor which is proportional to the line current, without this current source causing a voltage drop in the current path between the switching transistor and the remaining elements of the telephone circuit. The switching transistor is constantly kept in the saturated state, irrespective of the magnitude of the line current.

In a specific embodiment of a telephone set dial pulsing circuit in accordance with the invention the telephone set is characterized in that for stabilizing the DC line voltage it comprises an active line stabilising circuit having an output transistor the emitter of which is connected to the other line terminal via an emitter resistor and passing all but the entire line current, and in that the converter means of the dial pulsing circuit are formed by this emitter resistor.

With this configuration it is achieved that the voltage drop already present across the emitter resistor can be used as the control voltage of the voltage controlled current source.

BRIEF DESCRIPTION OF THE DRAWINGS

The invention and its advantages are further described with reference to the following figures in which identical elements are referred to by identical reference numerals, where.

DESCRIPTION OF THE PREFERRED EMBODIMENTS

Figure 1:
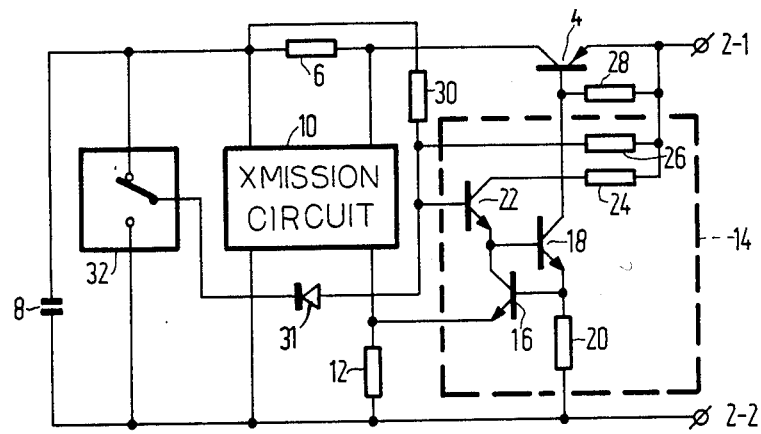
FIG. 1 shows a telephone set dial pulsing circuit in accordance with the invention having a PNP transistor as the pulsing element.

FIG. 1 shows these elements of the circuit of a telephone set dial pulsing circuit in accordance with the invention which are of importance to the invention. The subscriber line (not shown in the figure) is connected to terminals 2-1 and 2-2 via a rectifier bridge not shown in the figure either. Terminal 2-1 is connected to the emitter of a PNP switching transistor 4. The collector of this transistor is connected to line terminal 2-2 via the series arrangement of a line terminating resistance 6 and a supply capacitor 8. Transmission circuit 10 is parallel connected by means of its supply terminals to the supply capacitor 8. A line current terminal of transmission circuit 10 is connected to the junction of the collector of transistor 4 and line terminating resistance 6, whilst the remaining line current terminal of circuit 10 is connected to terminal 2-2 via a resistance 12.

Current source 14 comprises a control transistor 16, a main current transistor 18, a supply transistor 22, an emitter resistor 20, and two further resistors 24 and 26. The collector of the main current transistor 18 is connected to the base of switching transistor 4 and the emitter of this transistor 18 is connected to terminal 2-2 via emitter resistor 20. The emitter of the main current transistor 18 is likewise connected to the base of control transistor 16 whose collector is connected back to the base of main current transistor 18. The emitter of control transistor 16 forms the voltage controlled input of current source 14. To the collector of control transistor 16 is connected the emitter of supply transistor 22 whose collector is connected to terminal 2-1 via resistor 24. The base of supply transistor 22 is likewise connected to terminal 2-1 via a resistor 26. The base of supply transistor 22 forms the pulse input of current source 14. This pulse input is connected to the output of a pulsing circuit 32 over a diode 31, the anode of which is connected to this pulse input. The supply terminals of this pulsing circuit are connected in parallel with the supply capacitor 8. The voltage controlled input of current source 14 is connected to the other line current terminal of transmission circuit 10.

The junction of line terminating resistance 6 and supply capacitor 8 is connected via a resistor 30 to the pulse input of current source 14. A resistance 28 has been inserted between the emitter and the base of the switching transistor 4.

To explain the operation of the circuit as shown in FIG. 1 it is assumed that transmission circuit 10 comprises an active circuit for stabilizing the DC line voltage; such a stabilising circuit comprises an output transistor connected between the line current terminals of transmission circuit 10. The emitter of this output transistor is connected via series resistor 12 to line terminal 2-2. In such a stabilising circuit virtually the entire line current is passed through the output transistor. It is assumed that the entire line current is allowed to pass through this output transistor, thus through the series resistor 12. Consequently, the voltage across resistor 12 is proportional to the line current.

The voltage across resistor 12 is supplied to the emitter of transistor 16, which forms the voltage controlled input of current source 14. As a result of this the voltage across resistor 20 becomes equal to the sum of the voltage across series resistor 12 and the base-emitter voltage of transistor 16. The current through resistor 20, thus through transistor 18 as well, is linearly related to the line current. THe current through transistor 18 is composed of a constant part and a part proportional to the line current. The constant part equals the ratio of the base-emitter voltage of transistor 16 to the resistor 20; the proportionality constant of the part proportional to the line current equals the ratio of resistor 12 to resistor 20. By selecting the drive current of switching transistor 4 in the above described manner, the transistor 4 is achieved to be constantly in the saturated state, both at high and low line current.

Via supply transistor 22 and resistor 24 connected in series therewith the transistors 16 and 18 can constantly be supplied with currents, irrespective of the switching state of switching transistor 4. By using transistor 22 the circuit will appear as a high impedance at the terminals when transistor 4 is rendered non-conductive. If transistor 22 with conducting switching transistor 4 is driven into saturation, resistor 24 guarantees that a well defined impedance is produced at the terminals. Resistor 26 enables transistor 22 to be rendered conductive whilst switching transistor 4 is rendered non-conductive. As resistor 26 has a high resistance an additional resistor 30 has been included. If transistor 4 changes from the non-conductive state to the conductive state the voltage between terminals 2-1 and 2-2 drops because of the voltage drop of the line current over the line resistance. In consequence of this the base current of transistor 22 could become too small thus causing transistor 4 to stay out of the saturated state. To avoid this situation resistor 30 is inserted for providing the base of transistor 22 with sufficient current.

Pulsing circuit 32 is symbolically represented as a change-over switch capable of optionally applying positive or negative line voltage to its output. This circuit derives only little supply current from the telephone line. If the output voltage of pulsing circuit 32 equals the negative supply voltage, diode 31 will be rendered conductive because of resistors 30 and 26 which are connected to a higher voltage. The voltage over diode 31 is now approximately 0.7 V (the diode conductive voltage) as a consequence of which transistor 22 will be rendered non-conductive hence rendering transistor 18 non-conductive too, as a result of which switching transistor 4 will be rendered non-conductive as well. If the output voltage of pulsing circuit 32 equals the positive supply voltage, diode 31 will be rendered non-conductive. The base of transistor 22 now is supplied with current via resistors 26 and 30. The effect of diode 31 is that the base current of transistor 22 will not become exceedingly large.

Figure 2:
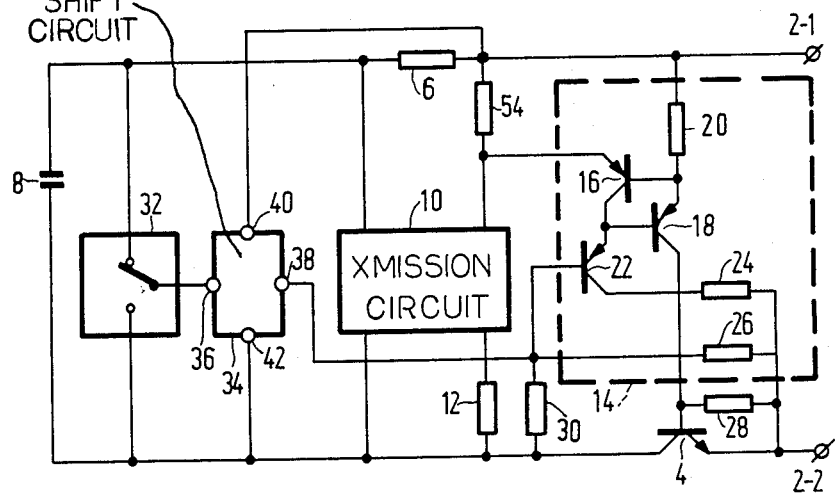
FIG. 2 shows an embodiment of the invention having an NPN transistor as the pulsing element.

The circuit in accordance with FIG. 2 is designed for use with an NPN switching transistor 4, allowing this figure to be a variant of the circuit according to FIG. 1. This FIG. 2 is derived from FIG. 1 by inserting a measuring resistor 54, by inserting a level-shift circuit 34 and by further selecting all transistors in current source 14 to be of a complementary conductive type. Measuring resistor 54 is connected between terminal 2-1 and the input line current terminal of transmission circuit 10, to which likewise the control input is connected formed by the emitter of control transistor 16. Supply terminal 40 of level-shift circuit 34 is connected to terminal 2-1, the supply terminal 42 of this circuit being connected to the collector of switching transistor 4. Signal input 36 of circuit 34 is connected to the output of pulsing circuit 32 and signal output 38 of circuit 34 is connected to the pulse input of current source 14. An embodiment of level shift circuit 34 is shown in FIG. 3.

The function of series resistor 12 in FIG. 1 is taken over in FIG. 2 by measuring resistor 54, so that the current produced by current source 14 is linearly related to the voltage drop across measuring resistor 54. Apart from this the operation of current source 14 in FIG. 2 takes place in the same way as described with reference to Figure 1.

Level shift circuit 34 has a two-fold function: when the switching transistor 4 is in the conductive state this circuit limits the current by means of resistor 20 and when transistor 4 is in the non-conductive state this circuit prevents leakage current through current source 14 from happening. If the base of transistor 22 were brought to the potential of the collector of transistor 4 via pulsing circuit 32, transistor 4 being conductive, a current path would be formed via resistor 20, the emitter-to-base junction of transistor 18 the emitter-to-base junction of transistor 22, via pulsing circuit 32 to the collector of transistor 4. In the so formed current path the current would mainly be determined by the magnitude of resistance 20 as a result of which the current can become too large. If the base of transistor 22 were connected via pulsing circuit 32 to the junction point of resistor 6 and capacitor 8 there would be a possibility for transistor 18 to keep conducting a slight current. Consequently, switching transistor 4 would not be rendered non-conductive sufficiently despite a drive towards the non-conductive state. This phenomenon could be caused by the supply current of the additional telephone circuitry, which supply current runs through line terminating resistor 6 there causing a voltage drop. This voltage drop causes transistors 22 and 18 not to be rendered non-conductive completely, a slight current being still supplied to the base of switching transistor 4.

Figure 3:
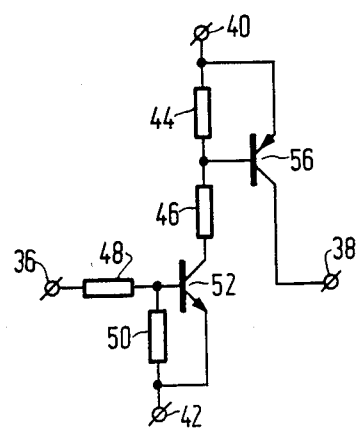
FIG. 3 shows a level-shift circuit as used in the circuit according to FIG. 2.

The lay-out of level-shift circuit 34 is shown in FIG. 3. Between the supply terminals 40 and 42 there is a series arrangement of successively a resistor 44, a resistor 46 and the main current path of a transistor 52 whose emitter is connected to the supply terminal 42. Between the signal input 36 and the base of transistor 52 a resistor 48 is inserted and in parallel with the emitter-to-base junction of transistor 52 a resistor 50 is inserted. Between supply terminal 40 and signal output 38 the main current path of a transistor 56 is inserted whose emitter is connected to the supply terminal 40. The base of transistor 56 is connected to the junction of resistors 44 and 46.

The operation of level-shift circuit 34 is as follows: if signal input 36 is brought to the potential of terminal 42 via pulsing circuit 32, transistor 52 will be rendered non-conductive; consequently, also transistor 56 will be rendered non-conductive. However, in current source 14 a current path will be formed by resistor 20 the emitter-to-base junction of transistor 18, the emitter-to-base junction of transistor 22 via resistor 26 to terminal 2-2. Transistor 18 is rendered conductive by the current running through this current path rendering switching transistor 4 saturated.

If the signal input 36 via pulsing circuit 32 gets the potential of the junction between line terminating resistor 6 and supply capacitor 8 transistor 52 will be conductive. Consequently, transistor 56 will be saturated so that the voltage of signal output 38 becomes substantially equal to the voltage of terminal 2-1. The base of transistor 22 will now receive the same voltage so that transistor 22, and consequently transistor 18, will be rendered non-conductive. So doing the switching transistor 4 is rendered non-conductive without the possibility of leakage currents occurring.

The following table shows typical values of the components of the described embodiments of the invention.

What is claimed is:

1. A telephone set dial pulsing circuit for connection to the two terminals of a subscriber line to provide pulsed interruptions of the subscriber line current, comprising a bipolar switching transistor whose main current path is situated between one of such line terminals and the remaining circuit elements of the telephone set and whose emitter is connected to the aforesaid one line terminal; the improvement characterized in that such dial pulsing circuit comprises a control circuit connected to a controllable current source having a control input and an output which is connected to the base of the switching transistor, the output current of the current source increasing with the line current under control of the control circuit; such control circuit comprises converter means for producing a control voltage proportional to the line current; and the controllable current source is a voltage-controlled current source which is controlled by the control voltage applied to its control input by the converter means.

2. A telephone set dial pulsing circuit as claimed in claim 1, characterized n that the current source comprises a control transistor and a main current transistor the collector of which is the output of the current source; the emitter of the main current transistor is connected by an emitter resistor to the other of the two subscriber line terminals and to the base of the control transistor, the base of the main current transistor is connected to the collector of the control transistor, and the emitter of the control transistor is the control input of said current source; and further comprising supply means for supplying current from said one subscriber line terminal to the collector of the control transistor.

3. A telephone set dial pulsing circuit as claimed in claim 2, characterized in that said supply means comprises the series arrangement of the main current path of a third transistor and a resistor connecting said one line terminal to the collector of said third transistor, the emitter of said third transistor being connected to the collector of the control transistor.

4. A telephone set dial pulsing circuit as claimed in claim 3, further comprising a dial pulsing generator, the base of said third transistor being connected to the output of such dial pulsing generator.

5. A telephone set dial pulsing circuit as claimed in claim 1, for use in a telephone set which comprises an active circuit for stabilizing the DC line voltage, such stabilizing circuit having an output transistor the emitter of which is connected to said second line terminal by an emitter resistor passing substantially the entire line current; characterized in that said converter means is said emitter resistor of said stabilizing circuit.

* * * * *